(12) United States Patent
Lacatus et al.

(10) Patent No.: US 8,548,106 B2
(45) Date of Patent: Oct. 1, 2013

(54) CROSSCORRELATION INTERFERENCE MITIGATING POSITION ESTIMATION SYSTEMS AND METHODS THEREFOR

(75) Inventors: Catalin Lacatus, South Brunswick, NJ (US); David Akopian, San Antonio, TX (US); Mehdi Shadaram, San Antonio, TX (US)

(73) Assignee: Board of Regents, The University of Texas System, Austin, TX (US)

( * ) Notice: Subject to any disclaimer, the term of this patent is extended or adjusted under 35 U.S.C. 154(b) by 865 days.

(21) Appl. No.: 12/565,434

(22) Filed: Sep. 23, 2009

(65) Prior Publication Data

US 2010/0080268 A1    Apr. 1, 2010

Related U.S. Application Data

(60) Provisional application No. 61/099,465, filed on Sep. 23, 2008.

(51) Int. Cl.
*H04L 25/08* (2006.01)
*H04B 1/00* (2006.01)

(52) U.S. Cl.
USPC .......................................... 375/346; 375/130

(58) Field of Classification Search
USPC ................. 375/346, 130, 137, 147, 260, 347, 375/141, 316; 342/357.09, 357.1
See application file for complete search history.

(56) References Cited

U.S. PATENT DOCUMENTS

| | | | |
|---|---|---|---|
| 6,236,354 B1 | 5/2001 | Krasner | |
| 6,501,420 B2 * | 12/2002 | Townsend et al. | 342/357.74 |
| 7,116,704 B2 | 10/2006 | Norman et al. | |
| 7,598,908 B2 * | 10/2009 | Chao et al. | 342/357.59 |
| 2002/0159506 A1 * | 10/2002 | Alamouti et al. | 375/147 |
| 2007/0058696 A1 | 3/2007 | Dempster et al. | |
| 2008/0284647 A1 * | 11/2008 | Oren et al. | 342/357.09 |
| 2009/0121927 A1 * | 5/2009 | Moshfeghi | 342/357.03 |
| 2010/0098137 A1 * | 4/2010 | Matsuyama et al. | 375/149 |

* cited by examiner

*Primary Examiner* — Khai Tran

(74) *Attorney, Agent, or Firm* — Meyertons, Hood, Kivlin, Kowert & Goetzel, P.C.; Eric B. Meyertons

(57) ABSTRACT

Provided is a method that includes dynamically adjusting a GPS signature code to minimize the interference (e.g., the cross-correlation interference) experienced due to one or more other GPS signals. Further provided is a method that includes adjusting the complexity of an adaptive solution to reduce the time and processing power associated with tracking a GPS signal.

24 Claims, 10 Drawing Sheets

CROSSCORRELATION INTERFERENCE MITIGATING POSITION ESTIMATION SYSTEMS AND METHODS THEREFOR

PRIORITY CLAIM

This application claims the benefit of priority of U.S. Provisional Patent Application Ser. No. 61/099,465 titled "SYSTEM AND METHOD FOR CROSSCORRELATION INTERFERENCE MITIGATION", filed on Sep. 23, 2008, whose inventors are Catalin Lacatus, David Akopian, and Mehdi Shadaram, which is hereby incorporated by reference in its entirety as though fully and completely set forth herein.

BACKGROUND

1. Field of the Invention

The present invention relates generally to satellite communications, and more particularly to a system and method to improve the operation of Global Positioning System (GPS) receivers in weak signal conditions.

2. Description of Related Art

During recent years location technologies have emerged as a promising research area with many high-impact applications in daily life. In particular, wireless operators around the world have identified Location Based Services (LBS) as an excellent opportunity for growth. Many of these applications are using Global, Positioning System (GPS) receivers for user position estimation. GPS receivers synchronize to satellite signals to estimate user-to-satellite ranges and apply trilateration methods for position computation. While GPS is designed for outdoor operation, recently many GPS receivers have been developed for indoor environments, where the satellite signals are significantly attenuated. Still these environments are very challenging for the receivers and their operation is not robust because of cross-correlation interference, multi-path presence, colored noise, etc.

The GPS receiver typically synchronizes to satellites in two steps: acquisition and tracking. Once the signal has been acquired, the receiver switches to tracking mode. Embodiments of this invention address the receiver operation during the tracking mode. In weak signal conditions, the receiver often loses the signal and the acquisition process has to be repeated. The loss of signal is very inconvenient as the acquisition process is time and resource consuming. In indoor and urban environments, the tracking process often fails due to the presence of strong multiple access interference (MAI) when strong signals jam weaker signals from the satellites. In such environments, the received signal powers may differ by more than 35 dB because of diverse propagation channels. GPS signals were initially designed for open-sky operation with cross-correlation interference immunity of about 20 dB, which is apparently not sufficient for many weak signal environments.

Conventional approaches use the same codes in the receivers and transmitters and they do not provide sufficient channel immunity in the presence of interfering strong signals. Advanced solutions modify despreading codes in the receivers in order to reduce the effects of MAI. For despreading code optimizations, one can use linear or non-linear approaches. The traditional non-linear interference cancellation techniques may not be applied to GPS receivers because of lack of training sequences, high computational loads and time delays. However, the linear receiver techniques may be feasible solutions. The decorrelator and minimum mean square error MMSE detectors have proven to be efficient techniques in decreasing the effects of the MAI in code division multiple access (CDMA) systems. The MMSE approach uses autocorrelation matrix inversion that is time and resource consuming. To simplify the processing, some methods estimate the cross-correlation signal and subtract it from the weak signal channel. This solution may not be optimal and computation overhead is still high especially in the presence of strong satellite signals. An ad-hoc solution has been suggested using an additional orthogonalization process for better separation of weak and strong channels. It has been observed that the performance of their method deteriorates with a few stronger signals and the method fails when there are more than four strong signals.

SUMMARY

Various embodiments of a reduced complexity adaptive algorithm for Global Positioning System (GPS) robust receiver in weak signal conditions system and method are provided. In one embodiment, a method includes dynamically adjusting a GPS signature code to minimize the interference (e.g., the cross-correlation interference) experienced due to one or more other GPS signals.

In one embodiment, a method includes receiving a GPS signal, measuring or otherwise tracking an interference associated with the received GPS signal, and adjusting various parameters to minimize the interference. In certain embodiments, adjusting various parameters to minimize the interference includes employing several iterations to determine a minimized or reduced mean square error (MSE) value associated with the interference and/or implementing parameters associated with the minimized or reduced mean square error (MSE) value. In certain embodiments, the iterations may be employed to determine an optimized despreading code that enables a GPS system to reduce the effects of a stronger GPS signal such that a weaker GPS signal may be received with reduced interference from the stronger GPS signal or other interfering signal. One embodiment includes dynamically adjusting the GPS despreading code based on the determined signature code that enables a GPS system to reduce the effects of a stronger GPS signal such that a weaker GPS signal may be received with reduced interference from the stronger GPS signal or other interfering signal. Certain embodiments employ one or more techniques that avoid the use of matrix inversions.

In another embodiment, a method includes repeatedly monitoring interference to determine when one GPS signal may be interfering with another. In certain embodiments, the method includes tracking the interference to determine when the GPS unit is indoors or otherwise blocked from receiving one or more strong GPS signals, and is instead receiving at least one weak GPS signal that is being interfered with by one or more strong GPS signals. The method, in certain embodiments, includes performing dynamic adjustment of the GPS despreading code based on the tracking of the interference.

In yet another embodiment, a method includes scaling the complexity of an adaptive solution to reduce the time and processing power associated with tracking a GPS signal. In certain embodiment, one or more coefficients are associated with one or more parameters of an overall expression that can be employed to determine an MSE associated with a GPS signal and related interference. In one embodiment, one or more of the coefficients are set to zero. When set to zero, parameters associated with the coefficient can be ignored, thereby enabling processing to ignore the related portion of the overall expression, thus reducing the complexity of computation related to the overall expression. In other words, setting an additional coefficient to zero may reduce the complexity of the overall expression and thereby reduce the time and computational power to solve the expression. Further, increasing the number of coefficients not set to zero may increase the accuracy of the expression, but may do so at the expense of increased complexity that leads to an increase in the time and computational power to solve the expression. Setting more coefficients to zero may thus increase the speed and reduce accuracy, where as setting fewer coefficients to zero may increase accuracy and reduce the speed to solve the expression. In another embodiment, one or more of the coefficients are quantized or set to certain discrete set of values. In such cases, the complexity of the computation related to the overall expression will be reduced.

In certain embodiments, a system may be used to implement the methods described herein.

BRIEF DESCRIPTION OF THE DRAWINGS

Advantages of the present invention will become apparent to those skilled in the art with the benefit of the following detailed description and upon reference to the accompanying drawings in which.

Figure 1A:
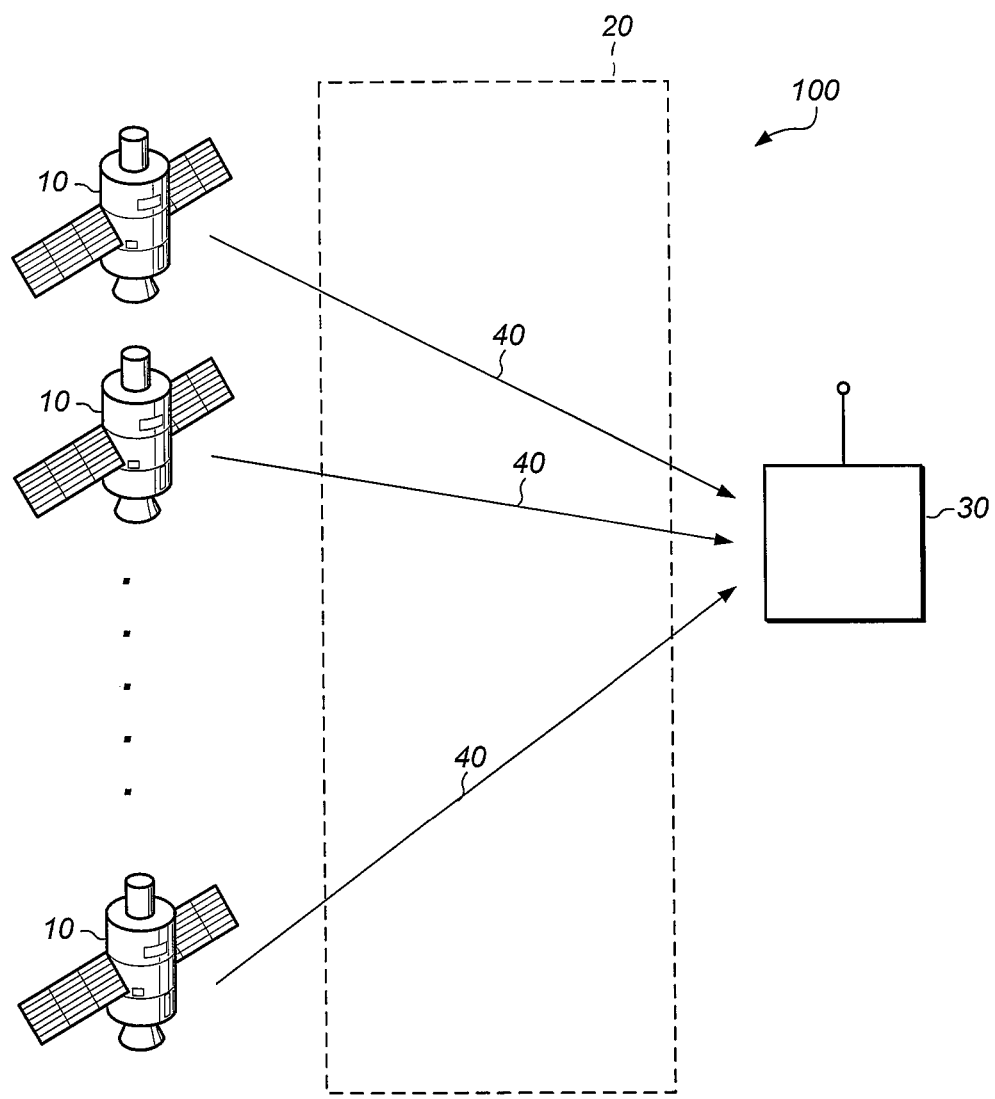
FIG. 1A illustrates an embodiment of a GPS system.

While the invention is susceptible to various modifications and alternative forms, specific embodiments thereof are shown by way of example in the drawings and will herein be described in detail. The drawings may not be to scale. It should be understood, however, that the drawings and detailed description thereto are not intended to limit the invention to the particular form disclosed, but to the contrary, the intention is to cover all modifications, equivalents, and alternatives falling within the spirit and scope of the present invention as defined by the appended claims.

DETAILED DESCRIPTION OF ILLUSTRATIVE EMBODIMENTS

I. Introduction

The following discloses embodiments of a system and method directed to reduced complexity adaptive despreading code design for GPS receivers As discussed in more detail below, certain embodiments are directed to reduce complexity of algorithms for improved operation of Global Positioning System (GPS) receivers in weak signal conditions. This is based on the modification of despreading codes in receiver channels tracking weak signals to minimize the interference caused by stronger satellite signals. This interference may be due to diverse dispersions in indoor propagation channels and may be similar to near-far effects observed in CDMA systems. The analytical solutions are based on the convex optimization theory where the mean squared error (MSE) is regarded as a convex cost function in the despreading code. First, an adaptive algorithm is derived to avoid autocorrelation matrix inversions required by the conventional minimum mean squared error (MMSE) approaches that find codes minimizing MSE. Further, a new parameterized approach is described, providing a trade-off between computational complexity and interference cancellation performance. Additionally, provided are results of cost reduction methods based on thresholding and quantization of autocorrelation matrices.

In certain embodiments, a technique includes despreading code design approaches to minimize the cross correlation effects. In contrast to other techniques, optimal solutions are found with scalable computational constraints that trade-off the GPS receiver performance and complexity. In certain embodiments, the algorithms operate in an adaptive mode depending on the interference with the code tracking and code updates performed in parallel. The algorithms, in some embodiments, are implemented to minimize the mean squared error (MSE) during signal tracking process. Certain embodiments of methods are based on the convex optimization theory where the MSE is regarded as a convex function in the despreading code. At the optimal point (optimal despreading code), the algorithm may maximize the signal-to-interference-plus-noise ratio (SINR) for the weak signal. In certain embodiments, the compact form of the MSE gradient may help to make this method easy to implement in an adaptive and computationally efficient way (e.g., in a code-adjustment loop). One embodiment adaptively finds the optimal MMSE solution without matrix inversion. In certain embodiments, it has a computation complexity of order $O(N^2)$ versus $O(N^3)$ operations as in one MMSE approach based on matrix inversion. Examples of additional complexity reductions through thresholding and quantization of the autocorrelation matrix are provided, although the techniques are not limited to the provided examples. The approach in certain embodiments is feasible for channels being jammed by strong signals. Further, certain embodiments include a scalable MMSE method, also referred to as group-weighting that includes parameterized complexity constraints. Certain embodiments, have $O(M^2)$ operations, where parameter M provides the trade-off between the interference cancellation performance and computational load. In certain embodiments, the group-weighting method is equivalent with the conventional MMSE solution when M=N. The algorithms included in some embodiments may provide optimal solutions for all types of interference.

The following discussion is organized as follows: certain embodiments of a system model are provided in Section II, followed by an exemplary problem formulation in Section III. Section IV describes certain embodiments of the adaptive algorithm. Section V presents certain embodiments of parameterized reduced complexity methods. Embodiments of performance analysis, numerical and simulation examples are discussed in Section VI, and remarks are provided in Section VII.

II. System Considerations

FIG. 1A illustrates an embodiment of a GPS system. GPS system 100 includes satellites 10 communicatively coupled to GPS receiver 30 via communications channel 20. GPS receiver 30 receives GPS signals 40 transmitted by satellites 10. Any known protocol associated with signal transmission may be used. Further, GPS receiver 30 and satellites 10 may also be communicatively coupled by way of one or more relaying intermediate servers, routers, and/or other wireless network devices.

Figure 1B:
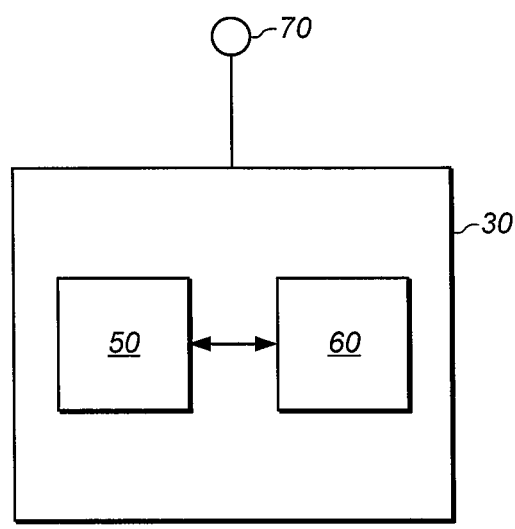
FIG. 1B illustrates an embodiment of the GPS receiver depicted in FIG. 1A.

FIG. 1B is a block diagram illustrating an embodiment of a GPS receiver. GPS receiver 30 includes signal receiver 70. In some embodiments, signal receiver 70 may receive GPS signals from one or more visible satellites. GPS receiver 30 also includes processing unit 50 coupled to memory medium 60 for executing programs. The programs stored in the memory medium may be executable by the processor to implement a method of position estimation.

In some embodiments GPS receiver 30 includes one or more components to facilitate data entry, e.g., a keyboard, mouse, touch-screen monitor, microphone, etc.

Consideration may include forward (satellite-to-receiver) GPS links with K visible satellites (e.g., satellite 1, satellite 2 ... satellite K) transmitting through a GPS receiver channel which use codes of size N, $s_1^0, s_2^0, \ldots, s_K^0$. Otherwise, there may be a signal space of dimension N occupying a finite common bandwidth. Without the loss of generality, it may be assumed that the GPS receiver channel (e.g., channel k) is already synchronized with a satellite signal under consideration (e.g., satellite k), and the task may include improving the reception quality of the signal transmitted by the satellite k through the channel k. In one embodiment, for one code period of the synchronized channel k, the codes $s_1^0, s_2^0, \ldots, s_K^0$ may be cyclically shifted due to different transmission delays and the shifted versions are denoted as $s_1^k, s_2^k, \ldots, s_K^k$. Codes other than those transmitted by satellite k might be modulated by a residual carrier due to Doppler shifts. These modulation effects are not explicitly discussed herein, but the algorithms adaptively adjust codes to cancel the interfering signals and there may be no constraining assumptions. The received, aggregated signal during a code period for the channel synchronized with satellite k may be modeled as:

$$r_k = \sum_{l=1}^{K} \sqrt{p_l}\, b_l^- s_l^- + \sum_{l=1}^{K} \sqrt{p_l}\, b_l^+ s_l^+ + n \qquad (1)$$

where $b_l^-$ and $b_l^+$ are the possible consecutive information symbols (bits) transmitted by satellite l.

The satellite codes $s_l^k = [s_{l1}, s_{l2}, \ldots s_{lN}]^T$ may be split into two segments $s_l^- = [s_{l1}, s_{l2}, \ldots, s_{lm_l}, 0, \ldots, 0]^T$ and $s_l^+ = [0, \ldots, 0, s_{lm_l+1}, s_{lm_l+2}, \ldots, s_{lN}]^T$ to account for possible bit transitions in code fragments that are not synchronized with the receiver channel k. The parameter $m_l$ may depend on the $l^{th}$ satellite's bit boundary relative to $k^{th}$ channel code boundaries. The term $p_l$ is the received power from the satellite l, and n is the noise that corrupts the received signal, and it can be modeled as zero-mean with covariance equal to a diagonal matrix $W = E[nn^T]$. Alternatively, the matrix W can incorporate colored noise.

Figure 2:
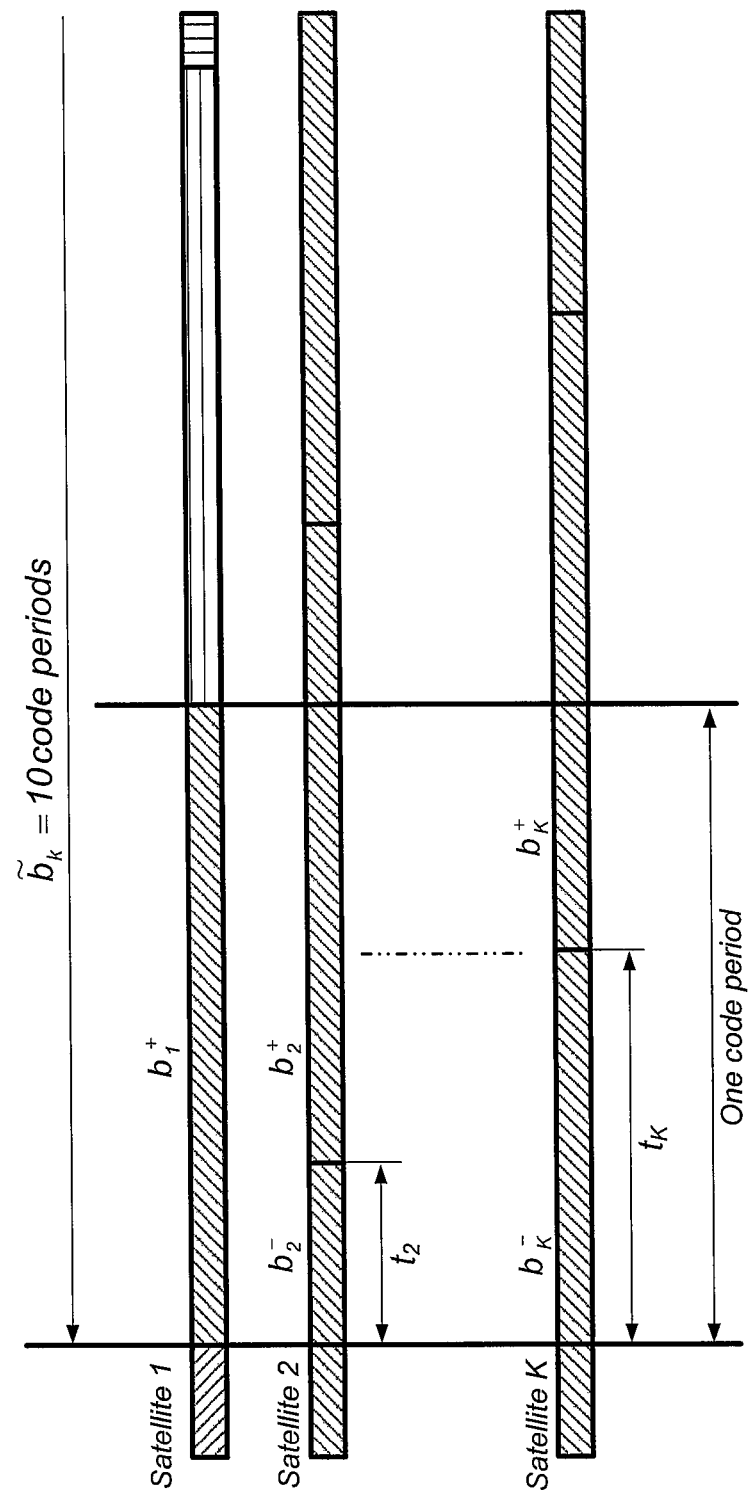
FIG. 2 is a diagram that illustrates a scenario where a received signal is code and bit synchronized with a satellite in accordance with one or more embodiments.

In one embodiment, let $S^- = [s_1^-, s_2^-, \ldots, s_K^-]$ and $S^+ = [s_1^+, s_2^+, \ldots, s_K^+]$ be the N×K codeword matrices, having the user codewords $s_l^-$ and $s_l^+$, defined above, as columns and $P = \mathrm{diag}[p_1, \ldots, p_k, \ldots, p_K]$ be K×K diagonal matrix of received satellite powers. The received signal may be represented in a compact matrix-vector form as:

$$r_k = S^- P^{1/2} b^- + S + P^{1/2} b^+ + n \qquad (2)$$

where $b^- = [b_1^-, b_2^-, \ldots, b_K^-]^T$ and $b^+ = [b_1^+, b_2^+, \ldots, b_K^+]^T$ are the consecutive information symbol vectors. FIG. 2 illustrates an embodiment where the GPS receiver channel is code and bit synchronized with the satellite 1.

In one embodiment, the receiver wipes-off (despreads) the codes by multiplying to a despreading code $h_k$ and integrating. For example, in one embodiment a correlator is used to correlate received signal and despreading replica. The decision variable for the satellite k, $d_k$, is:

$$d_k = h_k^T r_k \qquad (3)$$

where $h_k$ is a unit norm vector that does not amplify or attenuate the received power during a code/bit period.

The SINR for channel k may be given by:

$$\gamma k = \frac{\text{received power from satellite } k}{\text{interference-plus-noise power seen on channel } k} = \qquad (4)$$

$$= \frac{E[p_k b_k^2 (h_k^T s_k^0)^2]}{E\left[\left(h_k^T \left(r_k - \sum_{l=1,l\neq k}^{K} b_l^- \sqrt{p_l}\, s_l^- + \sum_{l=1,l\neq k}^{K} b_l^+ \sqrt{p_l}\, s_l^+ + n\right)\right)^2\right]}$$

Considering that the transmitted information bits $b_l^-$ and $b_l^+$ are i.i.d. processes, the SINR for the satellite k may become:

$$\gamma k = \frac{p_k (h_k^T s_k^0)^2}{E[(h_k^T (r_k - b_k^+ \sqrt{p_k}\, s_k^0))^2]} \qquad (5)$$

$$= \frac{p_k (h_k^T s_k^0)^2}{h_k^T (R_k - p_k (s_k^0)^T s_k^0) h_k}$$

where, $R_k = E[r_k r_k^T]$. An adaptive algorithm may be derived in order to design the optimal despreading code for satellite k in the presence of MAI and additive noise.

III. Problem Formulation

For the receiver optimization, certain techniques may take into account different criteria such as the maximization of SINR, the minimization of the MAI or the minimization of the MSE. In one embodiment of the present technique, an adaptive algorithm is implemented to minimize the MSE as a predefined cost function which is the MSE as seen in the channel assigned for a tracked satellite. The algorithm may work either as a modified correlator in tracking loops or as an additional correlator operating in parallel to tracking loops for improved signal reception. Each GPS receiver can minimize its cost function, $MSE_k$. In such an embodiment, the received signal may be correlated with the optimal despreading code, $h_k$. The MSE for each satellite k may be defined as:

$$MSE_k = E\left[\left(b_k - \frac{d_k}{\sqrt{p_k}}\right)^2\right] \qquad (6)$$

In one embodiment, this can be interpreted as a normalized MSE. Squaring the difference between the sent information (bits) and the normalized decision variable, the MSE will be:

$$MSE_k = E\left[b_k^2 - \frac{2b_k h_k^T r_k}{\sqrt{p_k}} + \frac{(h_k^T r_k)^2}{p_k}\right] \quad (7)$$

where the subscript identifies the tracking channel for satellite k. Considering that the information bits transmitted by the satellites may be i.i.d. processes, after simple manipulations the $MSE_k$ (7) can be written as:

$$MSE_k = 1 - 2h_k^T s_k^0 + \frac{h_k^T R_k h_k}{p_k} \quad (8)$$

The optimal point for unconstrained optimization may be characterized by the necessary Karush-Kuhn-Tucker (KKT) condition:

$$\frac{\partial MSE_k(h_k)}{\partial h_k} = 0 \quad (9)$$

where the first derivative of MSEk with respect to $h_k$ is given by:

$$\frac{\partial MSE_k(h_k)}{\partial h_k} = -2s_k^0 + \frac{2R_k h_k}{p_k} \quad (10)$$

From equations (9) and (10) the solution for the minimum mean squared error (MMSE) receiver may be found directly as:

$$h_k = p_k R_k^{-1} s_k^0 \quad (11)$$

Thus, the optimal point may be characterized by equation (11) for which the SINR at the $k^{th}$ receiver channel can be computed by substituting equation (11) in equation (5) and applying the matrix inversion lemma:

$$\gamma_K = \sqrt{p_k}(s_k^0)^T R_k^{-1} s_k^0 \quad (12)$$

In one embodiment, for the optimal despreading code it can be shown [20] that:

$$MSE_k = \frac{1}{1 + \gamma_k} \quad (13)$$

This theoretical result characterizes the optimal receiver in the sense that it maximizes the received SINR in the presence of multiple access interference (MAI) and colored noise. On the other hand, the implementation feasibility of conventional MMSE receiver may be questionable in a mobile enduser device. The computational cost of large size (at least 1023× 1023) matrix inversion ($R_k^{-1}$ in (11)) is typically very high for mobile devices and the computational complexity order is about $O(N^3)$. A goal may include the low-cost design of optimal despreading code that minimizes the $MSE_k$ in a changing environment.

IV. Despreading Code Adaptive Algorithm

One algorithm may be based on convex optimization theory and may avoid costly matrix inversions. In one such embodiment, the codes are changed adaptively in time depending on relative signal strengths and signal strength variations. The convergence speed and the estimation accuracy may be very suitable for GPS receivers. The MSE function for each receiver channel defined in (8) is a quadratic form in the despreading code, $h_k$, implying that it is twice differentiable:

$$\frac{\partial^2 MSE_k(h_k)}{\partial h_k^2} = \frac{2R_k}{p_k} \quad (14)$$

Since $R_k$ is a symmetric positive definite matrix, the $MSE_k$ may be a strictly convex function in $h_k$. Thus, for each satellite k the optimization problem can be formulated as the following minimization problem:

Find $h_k$ such as:

$$h_k = \underset{h_k}{\operatorname{argmin}} MSE_k(h_k) \quad (15)$$

The $MSE_k$ has a global minimum and to solve the problem (15), a gradient method may be employed. The next sequence, $h_k(t+1)$, may be estimated based on previous despreading code, $h_k(t)$, according to:

$$h_k(t+1) = h_k(t) - \mu \frac{\partial MSE_k(h_k)}{\partial h_k} \quad (16)$$

where μ is a small enough step size. The iteration (16) can be implemented as:

$$h_k(t+1) = h_k(t) - \frac{2\mu}{p_k}(R_k h_k - p_k s_k^0) \quad (17)$$

Thus, in one embodiment, the algorithm can be formally defined as the following procedure (Algorithm):
1) Input data: code, $s_k$, the received power, $p_k$ of satellite k, the correlation matrix of the received signal, $R_k$, the algorithm step size μ and the convergence tolerance ε.
2) Update the satellite's k's despreading code using equation (17).
3) Minimize the satellite k cost function according to (8) by replacing its current despreading code $h_k(t)$ with $h_k(t+1)$.
4) STOP if change in the receiver channel cost function, $MSE_k$, is less than ε, ELSE go to Step 2.

Figure 3:
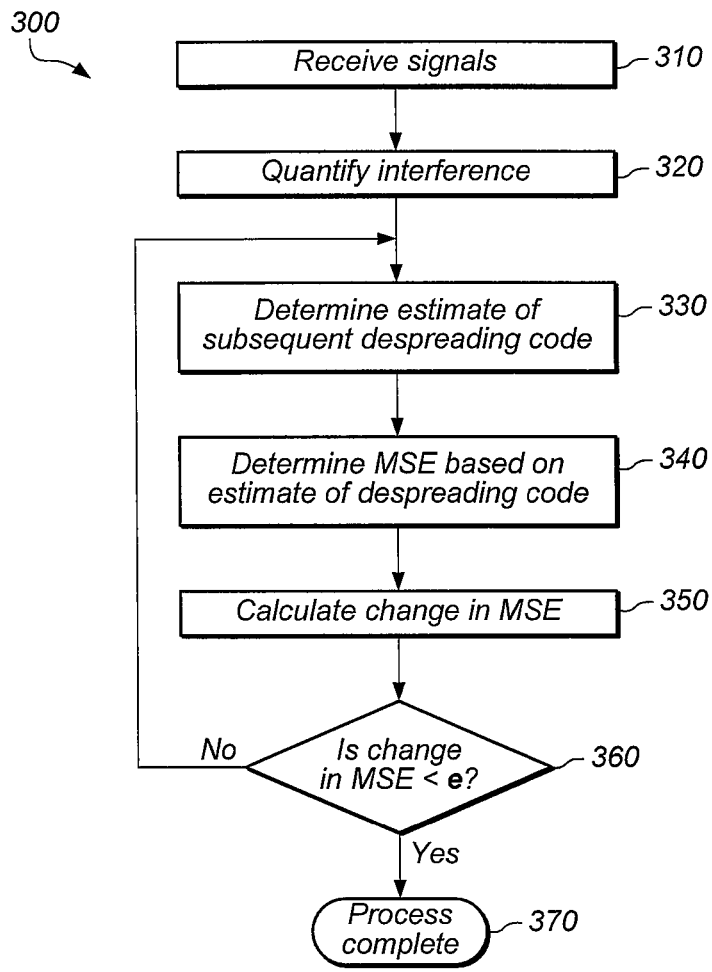
FIG. 3, is a flowchart depicting a method of position estimation via a GPS system.

FIG. 3 is a flowchart illustrating a method of position estimation with mitigated crosscorrelation interference via a Global Positioning System (GPS). Method 300, at block 310, includes receiving one or more signals via a GPS receiver. In some embodiments, at least one signal (e.g., a GPS signal) is a transmitted through a channel from a GPS satellite. The method further includes quantifying the interference associated with the GPS signal (block 320). In some embodiments, the GPS signal and a GPS receiver channel may be synchronized.

Method 300 also includes reducing the quantified interference. In certain embodiments, the interference is reduced by adjusting the GPS despreading code. In one embodiment, the GPS despreading code is adjusted dynamically depending on the quantified interference. As depicted at block 330, adjusting the GPS despreading code may include inputting parametric data into the GPS receiver. In some embodiments parametric data may include, but is not limited to, code, $s_k$, the received power, $p_k$ of satellite k, the correlation matrix of the received signal, $R_k$, the algorithm step size μ, and the convergence tolerance ε. Adjusting the GPS despreading code further includes minimizing the MSE of the GPS signal within the channel. Reducing the MSE of the GPS signal may include determining an estimated value of the subsequent despreading code based on a previous value of the despreading code (block 340). Reducing the MSE also includes calculating the change in MSE (block 350). In some embodiments, the change in MSE is quantified as the numerical difference between the MSE based on the estimated value of the despreading code and the MSE based on the previous value of the despreading code. In some embodiments, minimizing the MSE is an iterative process. For example, if it is determined that the change in MSE is greater than the convergence tolerance ε, a new estimated value of the despreading code may be determined and the process may continue (block 360). Conversely, if the change in MSE is less than the convergence tolerance c, the process may be completed (block 370).

Figure 4:
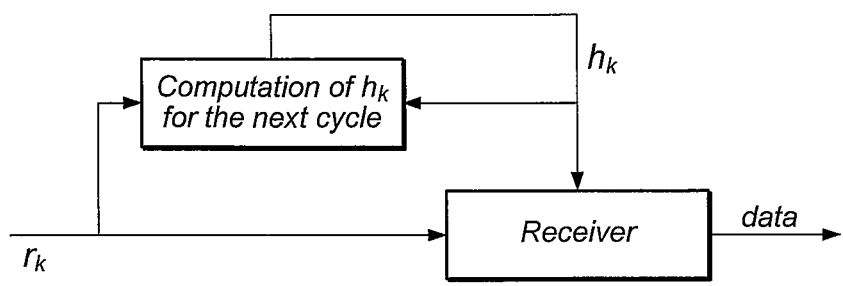
FIG. 4 is a block diagram that illustrates an algorithm iteration diagram in accordance with one or more embodiments.

In a real-time environment the procedure may continuously update $h_k$. The algorithm can be implemented as an additional loop (see FIG. 4) that works during tracking mode, in one embodiment.

The convergence of the algorithm may correspond to that of convex optimization problem where the gradient descent method is a tool for a small enough step size. The tolerance and speed of convergence of the algorithm can be adjusted through parameters, μ and ε similar to the gradient-based approaches. The optimal point is unique and may represent the global minimum of the $MSE_k$. In certain embodiments, the algorithm is not based on matrix inversions and it is more suitable for implementation in mobile enduser processors. It may have a computational complexity of order $O(N^2)$, while the classical MMSE or the orthogonalization procedure may have a computational complexity of order $O(N^3)$. For the GPS with code size N=1023, the algorithm may use at least $10^3$ time less computations. The despreading code optimization algorithm may not require explicit knowledge of the other users' codewords and powers, but only the user received power $p_k$, original satellite spreading sequence $s_k$, and the correlation matrix, $R_k$ of the received signal, $r_k$. While it may be supposed that the $p_k$ and $s_k$ can be provided by the acquisition stage, one embodiment may employ a new procedure that computes the received correlation matrix $R_k$. The correlation matrix of the received signal may be defined as:

$$R_k = E[r_k r_k^T] \qquad (18)$$
$$= E\begin{bmatrix}(S^- P^{1/2} b^- + S^+ P^{1/2} b^+ + n) \\ (S^- P^{1/2} b^- + S^+ P^{1/2} b^+ + n)^T\end{bmatrix}$$
$$= S^- P(S^-)^T + S^+ P(S^+)^T + W$$

where the averaging may be performed assuming statistically independent bits. It has been discussed herein that for each receiver channel, the received signals $r_k$ may be synchronized with the satellite k' code implying that $s_k^k = s_k^0$. As provided in (18), $R_k$ depends on relative code boundaries.

In general, the received correlation matrices of separate receiver channels may be different, $R_k \neq R_l$ for k≠l (i.e. asynchronous CDMA model). Experiments with different delayed signal configurations may confirm this. The employment of the same correlation matrix for all receiver channels may not provide an optimal solution. For this reason, the correlation matrix may be estimated for each channel independently.

An approach that may be used in statistical estimation of the received correlation matrices for each receiver channel is defined as below:

$$R_k(j+1) = \frac{j-1}{j} R_k(j) + \frac{1}{j} r_k(j) r_k(j)^T \qquad (19)$$

for k∈{1, 2, . . . , K}, where j represents the number of information bits for which the receiver makes the estimation. This is a blind estimation based only on the received signal and needs no specific knowledge of other satellites' power or spreading code. In such an estimation the only assumption may include that the receiver channel is synchronized with the corresponding satellite. This assumption may be realistic because the algorithm is implemented for the tracking mode.

V. Reduced Complexity Implementations

The algorithm described in the previous embodiments may decrease the computational load to $O(N^2)$. For one embodiment, such as the GPS case where N is typically larger than 1023, a computational load of over one million floating point additions and multiplications is still considered high. The following embodiments include several approaches to further reduce the computational complexity.

A. Thresholding Method

In this embodiment, a threshold is selected and all elements of the received correlation matrix that are smaller than the threshold are set to zero. The threshold may be chosen experimentally in such a way that the performance of the receiver does not deteriorate below certain limits. By choosing the threshold slightly higher than the smaller elements of the received correlation matrix, in certain embodiments, the number of multiplications may be decreased by between 28% and 50% for a maximum of 6 dB degradation in the received performances. The adaptive MSE algorithm implementation may be the same except for the thresholded correlation matrix.

B. Quantization Method

In this embodiment, the structure of the received correlation matrix, R, can be quantized such that the new quantized version, $\hat{R}$, will contain a small number of elements $w_1$, $w_2$, . . . , $w_L$ with L the number of quantization levels. In one embodiment, the multiplication $Rh_k$ that has a computation complexity of $O(N^2)$ can be transformed into L sums of the elements of $h_k$ weighted with the elements w1, w2, . . . , wL. In such an embodiment, by a proper software implementation the multiplicative computational complexity reduces to $O(N)$. Experiments demonstrated that L may need to be high enough (e.g., at or near 20) to maintain a comparable MAI compensation performance.

C. Group-Weighting Method

This embodiment may decrease the computation complexity by collapsing the original dimension of the optimization space, N, to a another dimension, M, with M<N. In one embodiment, the procedure is based on the definition of M new orthogonal dimensions by grouping the elements of received signal vector. Without the loss of generality, the received signal may be oversampled such that the new space dimension is $\tilde{N}=1024$ or other power-of-two. Choosing groups of dimension g, g being a power of 2, with $M=\tilde{N}/g$ the despreading code can be written as:

$$h_k = w_k(.*)s_k^0 \qquad (20)$$

where (.*) represents the element-by-element multiplication and $w_k$ is a vector of dimension N defined as:

$$w_k = [\underbrace{\underbrace{\tilde{h}_{k1}, \ldots, \tilde{h}_{k1}}_{g \text{ elements}}, \ldots, \underbrace{\tilde{h}_{kM}, \ldots, \tilde{h}_{kM}}_{g \text{ elements}}}_{M \text{ groups}}]^T \qquad (21)$$

The weighting despreading vector that may be optimized is:

$$\tilde{h}_k = [\tilde{h}_{k1}, \tilde{h}_{k2}, \ldots, \tilde{h}_{kM}]^T \qquad (22)$$

and has the dimension M. Based on the above definitions the algorithm presented in Section IV may be reformulated for the new dimension M. The MSE function may be redefined for each receiver channel. Employing the new definitions (20) and (22), the second term of (8) becomes:

$$h_k^T s_k^0 = g\tilde{h}_k^T 1_M \qquad (23)$$

The third term of (8) can be rewritten as:

$$\frac{h_k^T R_k h_k}{p_k} = \frac{(\tilde{w}_k(.*)s_k^0)^T R_k(.*)(\tilde{w}_k(.*)s_k^0)\tilde{w}_k}{p_k} \qquad (24)$$

$$= \frac{\tilde{w}_k^T [(s_k^0(.*)R_k)^T(.*)s_k^0]^T \tilde{w}_k}{p_k}$$

$$= \frac{\tilde{h}_k^T \tilde{R}_k \tilde{h}_k}{p_k}$$

The (N×N) matrix, $\bar{R}_k$, defines the following term:

$$\bar{R}_k = [(s_k^0(.*)R_k)^T(.*)s_k^0]^T \qquad (25)$$

Figure 5:
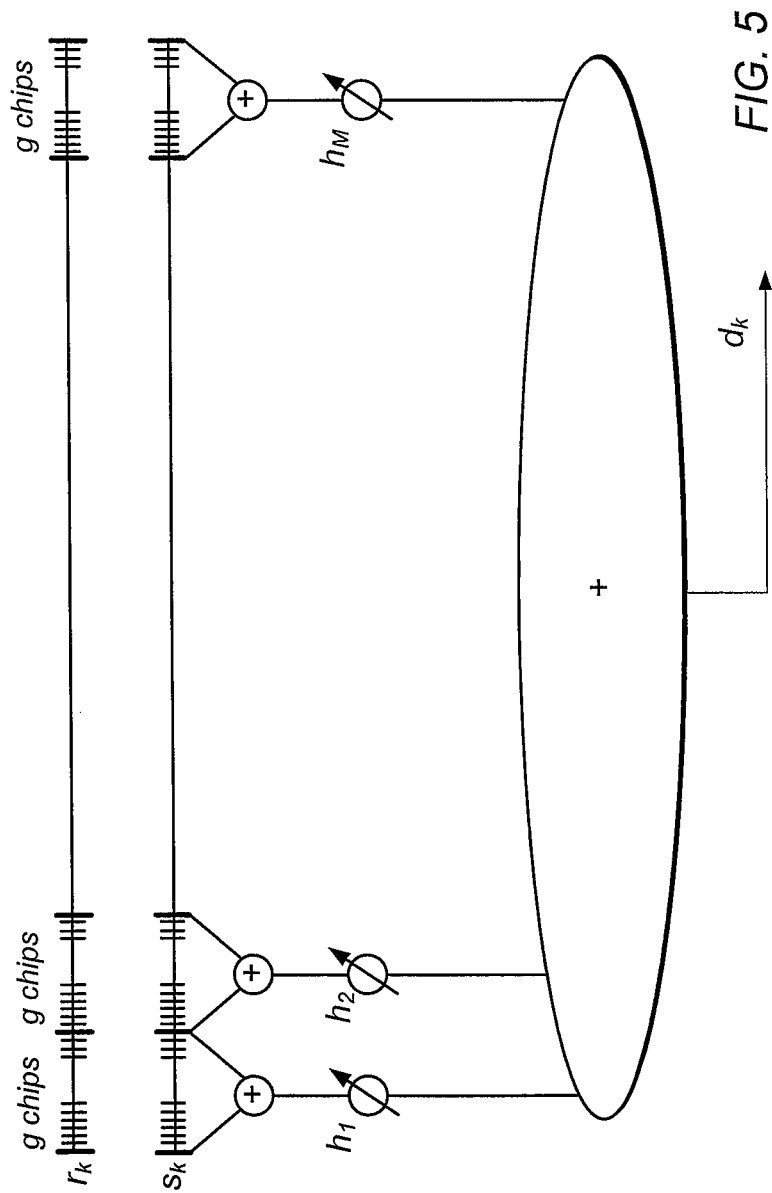
FIG. 5 is a diagram that illustrates a group-weighting method receiver implementation in accordance with one or more embodiments.

In (24) $\bar{R}_k$ collapses to $\tilde{R}_k$, of size (M×M), with the elements defined according to the following rule:

$$\tilde{R}_k(j,k) = \sum_{m=1}^{g}\sum_{n=1}^{g} \bar{R}((j-1)g+m, (k-1)g+n) \qquad (26)$$

for j, k=1, 2, ..., M. More explicitly, the above operations are presented in FIG. 5. Thus, the new cost function for each receiver may be:

$$\tilde{MSE}_k = 1 - 2\tilde{h}_k^T 1_M + \frac{\tilde{h}_k^T \tilde{R}_k \tilde{h}_k}{p_k} \qquad (27)$$

In one embodiment, the $\tilde{MSE}_k$ will also be a strictly convex function in $\tilde{h}_k$ for which the optimal vector that minimizes the $\tilde{MSE}_k$ can be found from KKT necessary optimal condition. Thus, $$\tilde{h}_k = gp_k \tilde{R}_k^{-1} 1_M \qquad (28)$$

may represent an optimal solution for the group-weighting method where the dimension of the optimization space collapses to M. These solutions are sub-optimal for g>1 in comparison with those provided by the optimal adaptive algorithm from Section IV. This may be due to the fact that the group-weighting method decreases the freedom of designing despreading code, but on the other hand, it may have the advantage of significantly decreasing the computational complexity. Moreover, the solution presented in (28) can be also implemented for a computational complexity of $O(M^3)$. Such a solution may have a computational gain, of order $O(g^3)$, in comparison with the MMSE solution (11).

However, more computational benefits may be obtained using an algorithm similar to one in Section IV where the iterations are performed as follows:

$$\tilde{h}_k(t+1) = \tilde{h}_k(t) - \frac{2\mu}{p_k}(\tilde{R}_k \tilde{h}_k - gp_k 1_M) \qquad (29)$$

Such an implementation has a computation complexity of order $O(M^2)$ for which the computation complexity decreases with $g^2$ in comparison with the optimal implementation. In one embodiment, the values of g can be chosen to trade-off interference suppression capability versus computational complexity. The estimation of the new received correlation matrix, $\tilde{R}_k$, will be blind, similar to that in (19).

VI. Simulations, Numerical Examples, and Discussions

Figure 6:
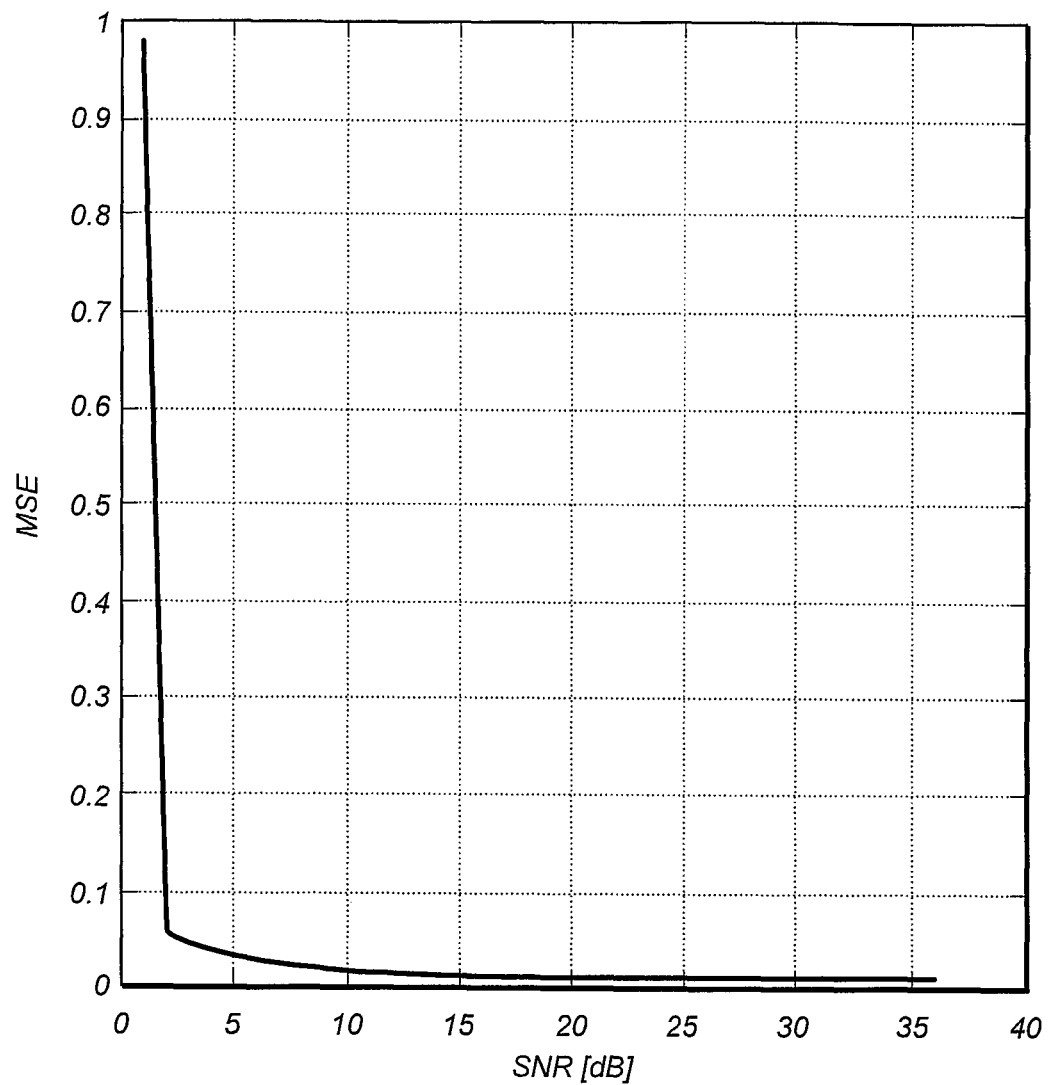
FIG. 6 is a plot that illustrates a convergence of the adaptive algorithm to the optimal solution for a first channel in accordance with one or more embodiments.

The performance of the algorithms may be verified through simulations. Algorithms may be compared with the optimal MMSE method and the conventional approach which uses the same transmitter and receiver codes. The algorithm efficiency in receiving a signal from the satellite 1 in the presence of K=5 visible satellites can be investigated. IN certain cases strong enough signals for decoding bits at reasonable BER after one code period integration may be used. This may be done to explicitly study the interference cancellation capability of algorithms. For higher noise levels the coherent integration may be performed over several code periods and the analysis extends straightforwardly to that case. In one embodiment, the adaptive approach the convergence step size parameter is set to $\mu=0.01$ for all simulations. For a scenario where the received signal powers from satellites 2 to 5 ($p_2, p_3, p_4, p_5$) are 20 dB higher compared to the power of tracked satellite 1. FIG. 6 illustrates an example of the convergence of the adaptive algorithm to the optimal solution for the first channel. The MSE is minimized and the despreading code is optimized. The speed of convergence can vary and may depend on the step size $\mu$ and the tolerance s as is the case of the gradient based approaches. Extensive simulations proved that the algorithm of Section IV converges to an optimal configuration where the minimum MSE is within $O(10^{-3})$ tolerance from the optimal value computed using equation (8) and also the maximum SINR is within $O(10^{-1})$ tolerance from the optimal SINR corresponding to the MMSE receiver. These small differences may be normal in the case of gradient approaches. Thus, in one embodiment, the cost efficient adaptive method converges to an optimal solution that matches the performance of the classical MMSE approach for interference cancellation.

Figure 7:
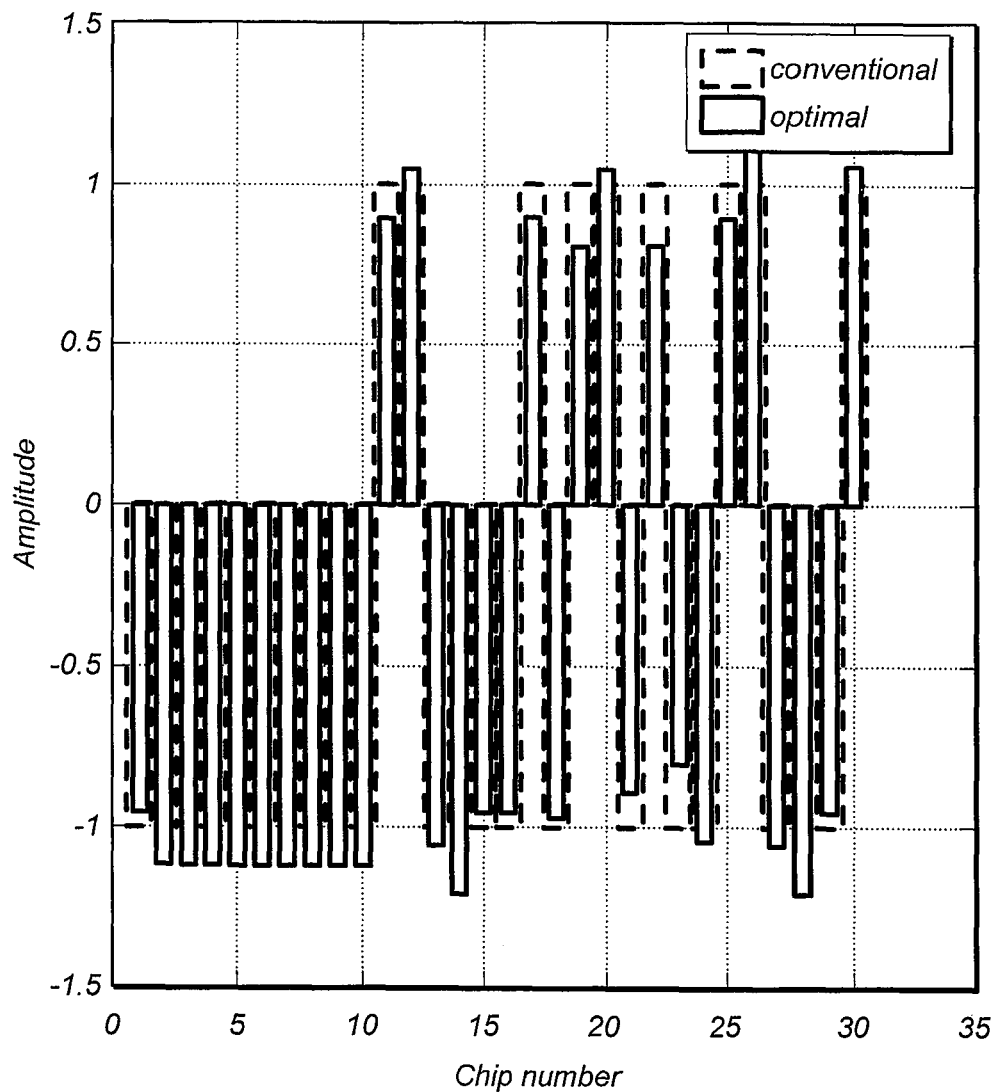
FIG. 7 is a plot that illustrates a despreading code amplitude in comparison with another satellite code in accordance with one or more embodiments.

In FIG. 7, an optimal despreading code amplitude is presented in comparison with the original satellite code, for the first 30 chips. Extensive simulations show that the optimal despreading code is a slight modification of the original code. In the depicted embodiment, there is no way to have multiple solutions, and the algorithm's convergence to the optimal point may be assured. Also, it is observed that the optimal and original despreading codes have the same chip polarities.

The illustrated simulations include the study of the performance of the algorithms presented in Section V that may provide additional computational gains. The simulations are set for K=5 satellites with the following received powers. The power of satellite signals 3 and 5 ($p_3$, $p_5$) is 10 dB higher compared with the signal from satellites 2 and 4 ($p_2$, $p_4$). The power of the first satellite signal is varying from −20 dB to 0 dB compared with $p_r$, $p_4$. In the following embodiments, the SNRs values are taken at the decision time.

Thresholding Method

Figure 8:
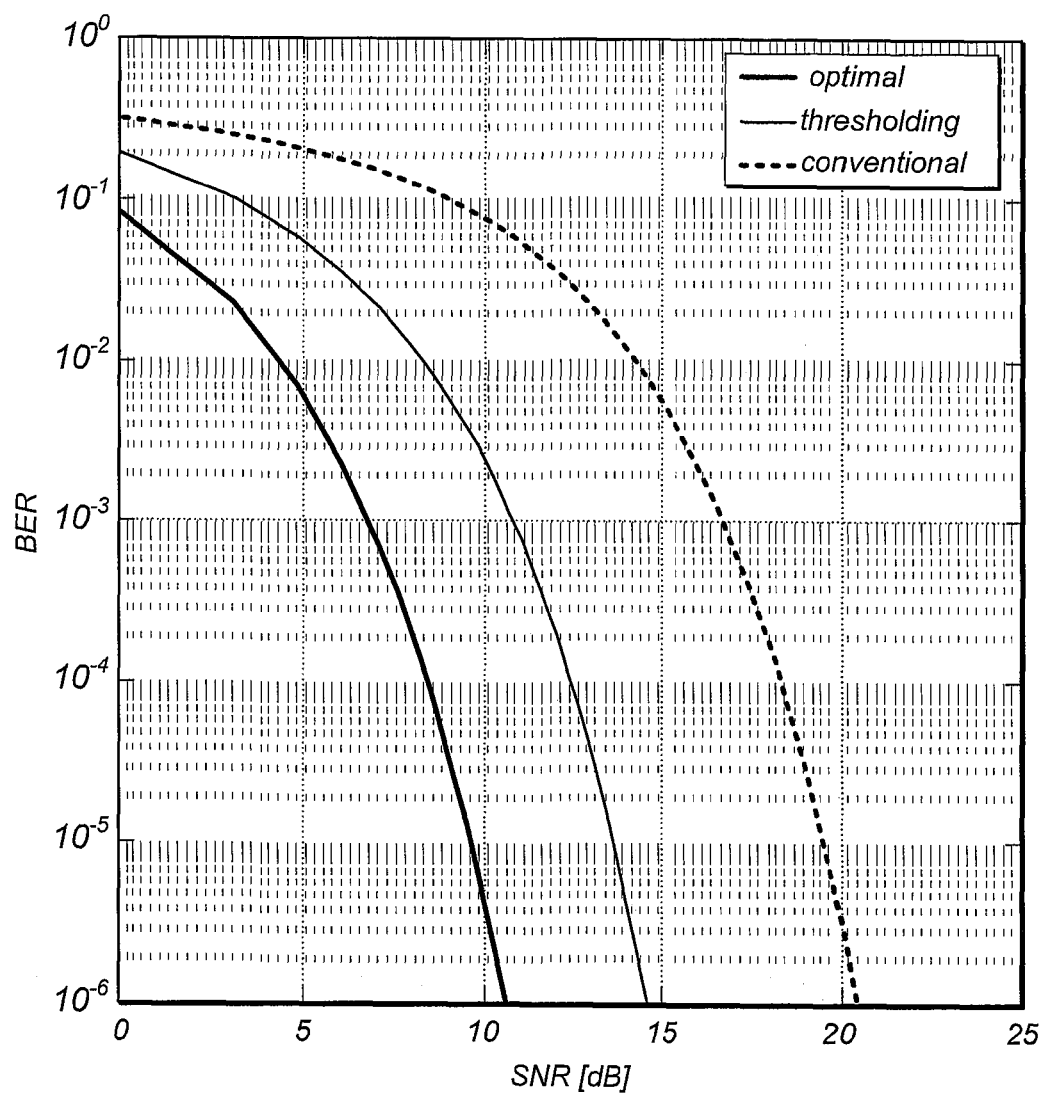
FIG. 8 is a plot that illustrates an exemplary performance of a thresholding method in accordance with one or more embodiments.

An exemplary performance of the thresholding method is presented in FIG. 8. This method provides 6 dB improvements in comparison with the conventional receiver, while one can observe a deterioration of 4 dB in comparison with the optimal MMSE receiver. Nevertheless, the computational complexity is 48% less.

Quantization Method

Figure 9:
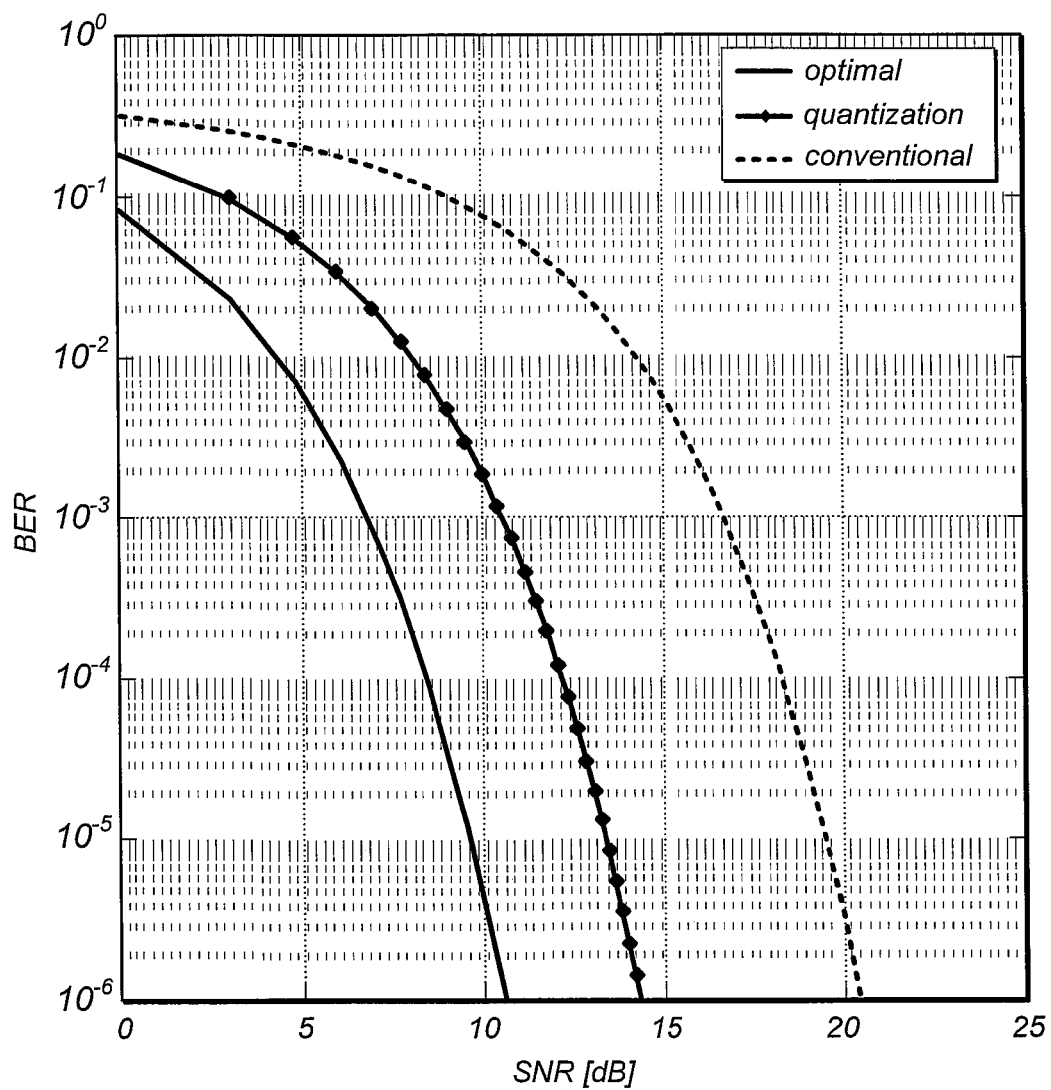
FIG. 9 is a plot that illustrates an exemplary performance of a quantization method in accordance with one or more embodiments.

An exemplary performance of the quantization method is presented in FIG. 9. This method provides 6.5 dB improvements in comparison with the conventional receiver, while a deterioration of 3.5 dB can be observed in comparison to the optimal receiver. In this approach the number of multiplications is decreased to L=21, while the number of sums is the same.

Group-Weighting Method with Computational Scalability

Figure 10:
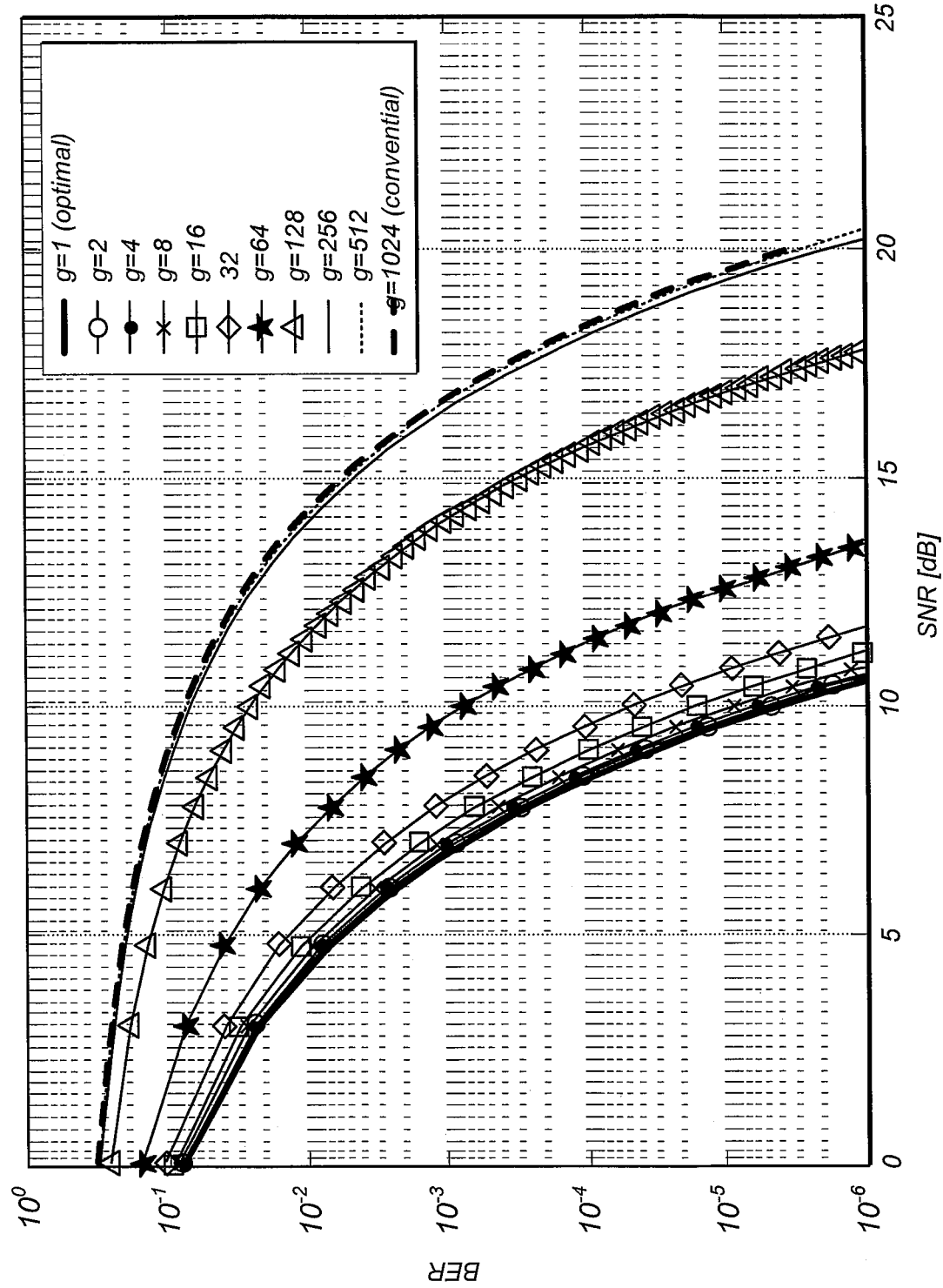
FIG. 10 is a plot that illustrates an exemplary performance of a group-weighting method in accordance with one or more embodiments.

An exemplary performance of the group-weighting method is presented in FIG. 10. The method efficiency is studied for the complexity scalability parameter $g=2^m$ with m=0, 1, 2, ..., 10. Parameter g may be selected to find a trade-off between interference suppression and computational complexity. The minimum value of g may correspond to the optimal MMSE solution, while the maximum is for conventional receiver with the same transmitter and receiver codes. In one embodiment, varying g one can select the best solution with the acceptable computational requirements. FIG. 10 shows BER performances for different g. For the illustrated embodiment, in order to have improvements of 9.75 dB of optimal MMSE receiver, the algorithm performs over one million additions and multiplications. If scalability parameter g=32 is selected the algorithm has to perform around 1024 multiplications and additions, while the improvements are still 8.5 dB compared with the conventional approaches. If the parameter g=64, the algorithm has to perform only 256 multiplications and additions with 7 dB improvements in comparisons with the conventional approach. The scalability, low computational complexity and the significant BER improvements in weak signal conditions make the group-weighting method an attractive approach for GPS receivers. In embodiments that include g=32 or g=64 the algorithm can be implemented on state-of-the-art floating point processors, while preserving impressive performance.

VII. Discussion

Certain embodiments include computationally efficient methods to design optimal despreading codes for suppressing multiple access interference in GPS receivers. In one embodiment, the first algorithm minimizes the MSE of weak signal channels during the tracking process. Even with significant reduction in the complexity of the algorithm, the performance may be the same as of the classical MMSE receiver. Further, three additional embodiments include methods that further decrease the computational complexity of the adaptive MSE despreading code optimization. In one embodiment, the thresholding method decreased the complexity up to 48% and still performed 6 dB better than the conventional receiver with the same transmitter and receiver codes. In one embodiment, the quantization method significantly decreased the number of multiplications, while still providing 6.5 dB improved performance as compared to conventional receivers. In one embodiment, the group-weighting method provided a trade-off between the receiver complexity and interference suppression performance by varying the scalability (grouping) parameter, g. In certain conditions, this algorithm provided the optimal solution within acceptable complexity constraints. The algorithms may be suitable for software radio implementations as they avoid costly matrix inversions required by the classical MMSE solution.

Further modifications and alternative embodiments of various aspects of the invention will be apparent to those skilled in the art in view of this description. Accordingly, this description is to be construed as illustrative only and is for the purpose of teaching those skilled in the art the general manner of carrying out the invention. It is to be understood that the forms of the invention shown and described herein are to be taken as examples of embodiments. Elements and materials may be substituted for those illustrated and described herein, parts and processes may be reversed or omitted, and certain features of the invention may be utilized independently, all as would be apparent to one skilled in the art after having the benefit of this description of the invention. Changes may be made in the elements described herein without departing from the spirit and scope of the invention as described in the following claims. The words "include", "including", and "includes" mean including, but not limited to.

REFERENCES

The following references are related to the above discussion and are herein incorporated by reference:

N. Agarwal, J. Basch, P. Beckman, P. P. Bharti, S. Bloebaum, S. Casadei, A. Chou, P. Enge, W. Fong, N. Hathi, W Mann, A. Sahai, J, Stone, J. Tsitsiklis, and B. V. Roy, "Algorithms for GPS operation indoors and downtown," In *GPS Solutions*, vol. 6, no. 3, Springler-Verlag Heidelberg., 2002, pp. 149-160.

D. Akopian, "Fast FFT based GPS satellite acquisition methods," *IEE Proceedings Radar Sonar and Navigation*, vol. 152, no. 4, August 2005.

M. S. Braasch and J. van Dierendonck, "GPS receiver architectures and measurements," *Proceedings of IEEE*, vol. 87, no. 1, pp. 48-64, 1999.

A. G. Dempster and E R Glennon, "Apparatus and method for mitigation of cross correlation in GPS system," US Patent Application Publication 2007/0058696, March 2007.

F. V. Diggelen and C. Abraham. "Indoor GPS technology. Global Locate White Paper, San Jose. http://www.global-locate.com."

R. Kohno, H. Imai, M. Hatori, and S. Pasupathy, "An adaptive canceller of cochannel interference for spread-spectrum multiple-access communication networks in a power line," *IEEE Journal on Selected Areas in Communications*, vol. 8, no. 4, pp. 691-699, May 1990.

N. F. Krasner, "Reducing satellite signal interference in a global positioning system receiver;" U.S. Pat. No. 6,236, 354, May 2001.

H. J. Landau and H. O. Pollack, "Prolate Spheroidal Wave Functions, Fourier Analysis and Uncertainty—III: The Dimension of the Space of Essentially Time- and Band-Limited Signals," *The Bell System Technical Journal*, vol. 41, no. 4, pp. 1295-1335. July 1962.

G. Lopez-Risueno and G. Seco-Granados, "CN0 Estimation and Near-Far Mitigation for GNSS Indoor Receivers," in

*Vehicular Technology conference, Spring* 2005, vol. 4. Stockholm, Sweden, May 2005. pp. 2624-2628.

U. Madhow and M. L. Honig, "MMSE Interference Suppression for Direct-Sequence Spread-Spectrum CDMA," *IEEE Transactions on Communications*, vol. 42, no. 12, pp. 3178-3188, December 1994.

U. Madhow, M. L. Honig, and V. S., "Blind Adaptive Multiuser Detection," *IEEE Transactions on Information Theory*, vol. 41, no. 4, pp. 944-960, July 1995.

P. Norman and C. R. Calm, "Strong signal cancellation to enhance processing of weak spread spectrum signal," U.S. Pat. No. 7,116,704, October 2006.

P. Sagiraju, S. Agaian, and D. Akopian, "Reduced complexity acquisition of GPS signals for software embedded applications," *IEE Proceedings Radar Sonar and Navigation*, vol. 153, no. 1, February 2006.

Zhao, Yilin, "Standardization of Mobile Phone Positioning for 3G Systems," *IEEE Communications Magazine*, no. 1, pp. 109-116. July 2002.

What is claimed is:

1. A method of position estimation with mitigated cross-correlation interference via a Global Positioning System (GPS) comprising:
   receiving one or more signals via a GPS receiver, wherein at least one signal is a GPS signal;
   quantifying an interference associated with the at least one received GPS signal; and
   reducing the quantified interference by adjusting a GPS despreading code wherein the GPS despreading code is adjusted by:
      determining a reduced mean squared error associated with the quantified interference; and
      determining the despreading code as a function of the mean squared error.

2. The method of claim 1, wherein adjusting the GPS despreading code comprises optimizing the despreading code to reduce the effects of one or more interfering signals such that the at least one received GPS signal is received with reduced interference.

3. The method of claim 1, wherein the mean squared error is reduced to a minimum value by iteratively estimating an optimized value of the despreading code.

4. The method of claim 1, further comprising monitoring the quantified interference.

5. The method of claim 4, wherein the GPS despreading code is adjusted dynamically based on the monitored quantified interference.

6. The method of claim 1, further comprising determining when the GPS receiver is at least partially impeded from receiving one or more strong GPS signals.

7. The method of claim 1, wherein adjusting the despreading code comprises one or more iterations, and wherein each iterative expression of the despreading code is a function of at least the previous iterative value of the despreading code, the power of the at least one received GPS signal, a correlation matrix associated with the at least one received GPS signal, a predetermined step size between each iteration, and the code of the at least one received GPS signal.

8. The method of claim 1, wherein adjusting the despreading code comprises:
   inputting at least the following parameters into the GPS system: the power of the at least one received GPS signal, a correlation matrix of the at least one received GPS signal, the step size between each iteration, a convergence tolerance of the solution, and the code of the at least one GPS signal;
   determining an estimated value of the subsequent despreading code based on a previous value of the despreading code;
   determining a mean squared error associated with the quantified interference based at least on the estimated value of the subsequent despreading code;
   calculating the change between the mean squared error based at least on the estimated value of the subsequent despreading code and a mean squared error based at least on the previous value of the despreading code; and
   comparing the change in mean squared error with the convergence tolerance.

9. The method of claim 8, further comprising setting all elements of the correlation matrix below a predetermined threshold to zero prior to determining an estimated value of the subsequent despreading code.

10. The method of claim 8, further comprising quantizing the correlation matrix, such that the quantized correlation matrix comprises a reduced number of elements, prior to determining an estimated value of the subsequent despreading code.

11. The method of claim 1, wherein elements of a subroutine of adjusting the despreading code are selected based on processing capabilities.

12. A Global Positioning System (GPS) receiver comprising:
   a signal receiver;
   a processing unit; and
   a memory coupled to the processing unit, the memory configured to store one or more programs executable by the processing unit to implement a method comprising:
      receiving one or more signals, wherein at least one signal is a GPS signal;
      quantifying an interference associated with the at least one received GPS signal; and
      reducing the quantified interference by adjusting a GPS despreading code wherein the GPS despreading code is adjusted by:
         determining a reduced mean squared error associated with the quantified interference; and
         determining the despreading code as a function of the mean squared error.

13. The GPS receiver of claim 12, wherein adjusting the GPS despreading code comprises optimizing the despreading code to reduce the effects of one or more interfering signals such that the at least one received GPS signal is received with reduced interference.

14. The GPS receiver of claim 12, wherein the mean squared error is reduced to a minimum value by iteratively estimating an optimized value of the despreading code.

15. The GPS receiver of claim 12, further comprising monitoring the quantified interference.

16. The GPS receiver of claim 15, wherein the GPS despreading code is adjusted dynamically based on the monitored quantified interference.

17. The GPS receiver of claim 12, wherein the method further comprises determining when the GPS receiver is at least partially impeded from receiving one or more strong GPS signals.

18. The GPS receiver of claim 12, wherein adjusting the despreading code comprises one or more iterations, and wherein each iterative expression of the despreading code is a function of at least the previous iterative value of the despreading code, the power of the at least one received GPS signal, a correlation matrix associated with the at least one received GPS signal, a predetermined step size between each iteration, and the code of the at least one received GPS signal.

19. The GPS receiver of claim 12, wherein adjusting the despreading code comprises:
  inputting at least the following parameters into the GPS system: a previous value of the despreading code, the power of the at least one received GPS signal, a correlation matrix of the at least one received GPS signal, the step size between each iteration, a convergence tolerance of the solution, and the code of the at least one GPS signal;
  determining an estimated value of the subsequent despreading code;
  determining a mean squared error associated with the quantified interference based at least on the estimated value of the subsequent despreading code;
  calculating the change between the mean squared error based at least on the estimated value of the subsequent despreading code and a mean squared error based at least on the previous value of the despreading code;
  comparing the change in mean squared error with the convergence tolerance.

20. The GPS receiver of claim 19, wherein adjusting the despreading code further comprises setting all elements of the correlation matrix below a predetermined threshold to zero prior to determining an estimated value of the subsequent despreading code.

21. The GPS receiver of claim 19, wherein adjusting the despreading code further comprises quantizing the correlation matrix, such that the quantized correlation matrix comprises a reduced number of elements, prior to determining an estimated value of the subsequent despreading code.

22. The GPS receiver of claim 12, wherein elements of a sub-routine of adjusting the despreading code are selected based on processing capabilities.

23. A method of position estimation with mitigated cross-correlation interference via a Global Positioning System (GPS) comprising:
  receiving one or more signals via a GPS receiver, wherein at least one signal is a GPS signal;
  quantifying an interference associated with the at least one received GPS signal; and
  reducing the quantified interference by adjusting a GPS despreading code, wherein adjusting the despreading code comprises one or more iterations, and wherein each iterative expression of the despreading code is a function of at least the previous iterative value of the despreading code, the power of the at least one received GPS signal, a correlation matrix associated with the at least one received GPS signal, a predetermined step size between each iteration, and the code of the at least one received GPS signal.

24. A Global Positioning System (GPS) receiver comprising:
  a signal receiver;
  a processing unit; and
  a memory coupled to the processing unit, the memory configured to store one or more programs executable by the processing unit to implement a method comprising:
    receiving one or more signals, wherein at least one signal is a GPS signal;
    quantifying an interference associated with the at least one received GPS signal; and
    reducing the quantified interference by adjusting a GPS despreading code, wherein adjusting the despreading code comprises one or more iterations, and wherein each iterative expression of the despreading code is a function of at least the previous iterative value of the despreading code, the power of the at least one received GPS signal, a correlation matrix associated with the at least one received GPS signal, a predetermined step size between each iteration, and the code of the at least one received GPS signal.

* * * * *